(12) United States Patent
Zhang

(10) Patent No.: US 8,978,806 B2
(45) Date of Patent: Mar. 17, 2015

(54) TELESCOPIC FRAME

(71) Applicant: Dongguan Prestige Sporting Products Co., Ltd., Dongguan, Guangdong (CN)

(72) Inventor: Zhao Zhang, Dongguan (CN)

(73) Assignee: Dongguan Prestige Sporting Products Co., Ltd., Dongguan, Guangdong (CN)

( * ) Notice: Subject to any disclaimer, the term of this patent is extended or adjusted under 35 U.S.C. 154(b) by 0 days.

(21) Appl. No.: 14/074,107

(22) Filed: Nov. 7, 2013

(65) Prior Publication Data
US 2014/0239673 A1 Aug. 28, 2014

(30) Foreign Application Priority Data
Feb. 27, 2013 (CN) ...................... 2013 2 0090436 U

(51) Int. Cl.
*B62D 61/00* (2006.01)
*B62D 31/00* (2006.01)
*B62K 15/00* (2006.01)

(52) U.S. Cl.
CPC .............. *B62D 31/006* (2013.01); *B62K 15/00* (2013.01)
USPC ..... 180/208; 280/785; 296/26.01; 296/26.02; 296/26.03; 296/26.04; 296/26.05

(58) Field of Classification Search
USPC ................. 280/785; 180/21, 24.02, 208, 209; 296/26.01, 26.02, 26.03, 26.04, 26.05, 296/26.13
See application file for complete search history.

(56) References Cited

U.S. PATENT DOCUMENTS

| | | | | |
|---|---|---|---|---|
| 4,611,683 | A * | 9/1986 | Hilmer .......................... | 180/209 |
| 5,102,127 | A | 4/1992 | Pohrer | |
| 5,368,121 | A * | 11/1994 | Priefert ......................... | 180/209 |
| RE43,943 | E * | 1/2013 | Andrews ....................... | 180/209 |
| 2002/0084664 | A1* | 7/2002 | McManus et al. ......... | 296/26.13 |
| 2002/0180232 | A1* | 12/2002 | Schneider et al. .......... | 296/26.01 |
| 2005/0067206 | A1* | 3/2005 | Trautman et al. ............. | 180/209 |
| 2005/0236856 | A1* | 10/2005 | Steury ........................ | 296/26.04 |
| 2008/0217946 | A1* | 9/2008 | Kobrehel et al. .......... | 296/26.13 |
| 2010/0148474 | A1 | 6/2010 | Wang | |
| 2013/0192907 | A1* | 8/2013 | Sarokham et al. .............. | 180/21 |

FOREIGN PATENT DOCUMENTS

EP 2481655 A2 8/2012

OTHER PUBLICATIONS

European Patent Office, "The Extended Search Report for European Application No. 13194795.4", Jan. 27, 2014.

\* cited by examiner

*Primary Examiner* — Toan To
(74) *Attorney, Agent, or Firm* — Morris Manning & Martin LLP; Tim Tingkang Xia, Esq.

(57) ABSTRACT

A telescopic frame is disclosed, which is applicable to a foldable bicycle or foldable electric vehicle, and includes a front frame, a rear frame and a telescopic device. First guide rails are symmetrically disposed on two sides of the front frame, second guide rails are symmetrically disposed on two sides of the rear frame, and the first guide rails and the second guide rails are fitted together and slidably connected. The telescopic device is fixed on the rear frame, and an output end of the telescopic device is fixed on the front frame to drive the front frame to be unfolded or folded relative to the rear frame. The telescopic frame is simple in structure and capable of being automatically folded.

11 Claims, 8 Drawing Sheets

TELESCOPIC FRAME

CROSS-REFERENCE TO RELATED APPLICATION

This application claims priority to and the benefit of, pursuant to 35 U.S.C. §119(a), Chinese Patent Application No. 201320090436.5, filed Feb. 27, 2013, which is incorporated herein by reference in its entirety.

FIELD OF THE INVENTION

The present invention relates generally to a vehicle frame, and more particularly to a telescopic frame which is applicable to a foldable bicycle or foldable electric vehicle and is capable of being automatically folded.

BACKGROUND OF THE INVENTION

With the improvement of living standards, the life philosophy of being distinctive, fashionable, healthy, and environmentally friendly becomes popular, and fashionable and environmentally friendly articles for daily use and vehicles are favored by more and more people. Bicycles and foldable electric vehicles evolve from being only a means of transport to being a symbol of a fashionable and healthy lifestyle, and are a means for practicing environmental protection. The increasingly popular foldable bicycle or foldable electric vehicle is characterized in saving storage room and being convenient to carry, as the volume of the bicycle after being folded is smaller than one fifth of a common bicycle. Since the bicycle is small and light, it is easy to be carried up and down stairs, into and out of an elevator, and into a bus or metro train. Furthermore, the foldable bicycle is pleasant to look at, and shows exquisite workmanship, thereby making it top equipment of fashion people.

However, in the existing foldable bicycle or foldable electric vehicle, the frame or the connecting mechanism used for connecting the front and rear frames has a complex structure, which contains multiple parts, is time and energy consuming when being folded, and is inconvenient to operate.

Therefore, it is in urgent need of a telescopic frame which is applicable to a foldable bicycle or foldable electric vehicle, has a simple structure, and is capable of being automatically folded.

SUMMARY OF THE INVENTION

The present invention is directed to a telescopic frame, which is applicable to a foldable bicycle or foldable electric vehicle, has a simple structure, and is capable of being automatically folded.

To achieve the above objective, the present invention provides a telescopic frame, which is applicable to a foldable bicycle or foldable electric vehicle, and includes a front frame, a rear frame and a telescopic device. First guide rails are symmetrically disposed on two sides of the front frame, second guide rails are symmetrically disposed on two sides of the rear frame, and the first guide rails and the second guide rails are fitted together and slidably connected. The telescopic device is fixed on the rear frame, and an output end of the telescopic device is fixed on the front frame to drive the front frame to be unfolded or folded relative to the rear frame.

Compared with the prior art, the telescopic frame of the present invention is formed by the front frame and the rear frame, the first guide rails are disposed on the front frame, the second guide rails are disposed on the rear frame, and the first guide rails and the second guide rails are fitted together and slidably connected, so that the front frame and the rear frame can slide relative to each other and are folded without requiring any auxiliary part, and thus the structure of the frame is simple. Besides, the telescopic device is fixed on the rear frame, and the output end of the telescopic device is fixed on the front frame, so that the telescopic device can drive the front frame to slide relative to the rear frame, and thus the frame is capable of being automatically folded.

In one embodiment, the first guide rail has a rib portion, the second guide rail has a guide rail groove, and the rib portion slidably matches with the guide rail groove. By disposing the rib portion on the first guide rail and forming the guide rail groove on the second guide rail, slidable connection between the first guide rail and the second guide rail is realized.

In one embodiment, two sliding slots are respectively formed between two side walls of the rib portion and two side walls of the guide rail groove.

In one embodiment, first sliding blocks are fixedly disposed on the side walls of the rib portion and slide in the sliding slots, second sliding blocks are fixedly disposed on inner side walls at an end of the second guide rail and slide in the sliding slots, and the first sliding blocks are capable of urging against the second sliding blocks to prevent the first guide rail and the second guide rail from being apart. By respectively disposing the first sliding blocks on the side walls of the rib portion and disposing the second sliding blocks on the inner side walls at the end of the second guide rail, and enabling the first sliding blocks and the second sliding blocks to slide in the sliding slots, the first guide rail and the second guide rail more closely match with each other, and slide more smoothly. Moreover, the first sliding blocks are capable of urging against the second sliding blocks to prevent the first guide rail and the second guide rail from being apart when the two guide rails are drawn away from each other.

In one embodiment, the telescopic frame further includes roller mechanisms, the roller mechanism includes rollers, the rollers are disposed in the sliding slot in a rolling manner, and the rollers urge against the first guide rail and the second guide rail. By disposing the rollers in the sliding slot and making the rollers urge against the first guide rail and the second guide rail, sliding friction generated when the first guide rail slides relative to the second guide rail can be partially converted into rolling friction, so that the first guide rail can slide relative to the second guide rail more smoothly.

In one embodiment, the roller is a cylindrical roller or a rolling ball.

In one embodiment, the roller mechanism further includes a slider bar, the slider bar is slidably disposed in the sliding slot and is provided with roller accommodating holes, and the rollers are disposed in the roller accommodating holes. By disposing the slider bar in the sliding slot and providing the slider bar with the roller accommodating holes for accommodating the rollers, when the first guide rail slides relative to the second guide rail, since the rollers are limited in the roller accommodating holes, the distance between the rollers does not change, and even contact is maintained between the rollers and the first guide rail and the second guide rail, so as to reduce as much as possible the friction between the first guide rail and the second guide rail.

In one embodiment, a limiting bump extends from the side wall of the rib portion, to limit lateral movement of the slider bar. The limiting bump can limit the slider bar to only slide along the length direction of the sliding slot, so that the slider bar does not move in other directions, and the first guide rail and the second guide rail are ensured to slide stably.

In one embodiment, the telescopic device is an electric push rod.

In another aspect, the invention relates to a foldable bicycle comprising the above disclosed telescopic frame.

In yet another aspect, the invention relates to a foldable electric vehicle comprising the above disclosed telescopic frame.

These and other aspects of the present invention will become apparent from the following description of the preferred embodiment taken in conjunction with the following drawings, although variations and modifications therein may be affected without departing from the spirit and scope of the novel concepts of the invention.

BRIEF DESCRIPTION OF THE DRAWINGS

Further features and benefits of the present invention will be apparent from a detailed description of preferred embodiments thereof taken in conjunction with the following drawings, wherein similar elements are referred to with similar reference numbers, and wherein.

DETAILED DESCRIPTION OF THE INVENTION

Figure 1:
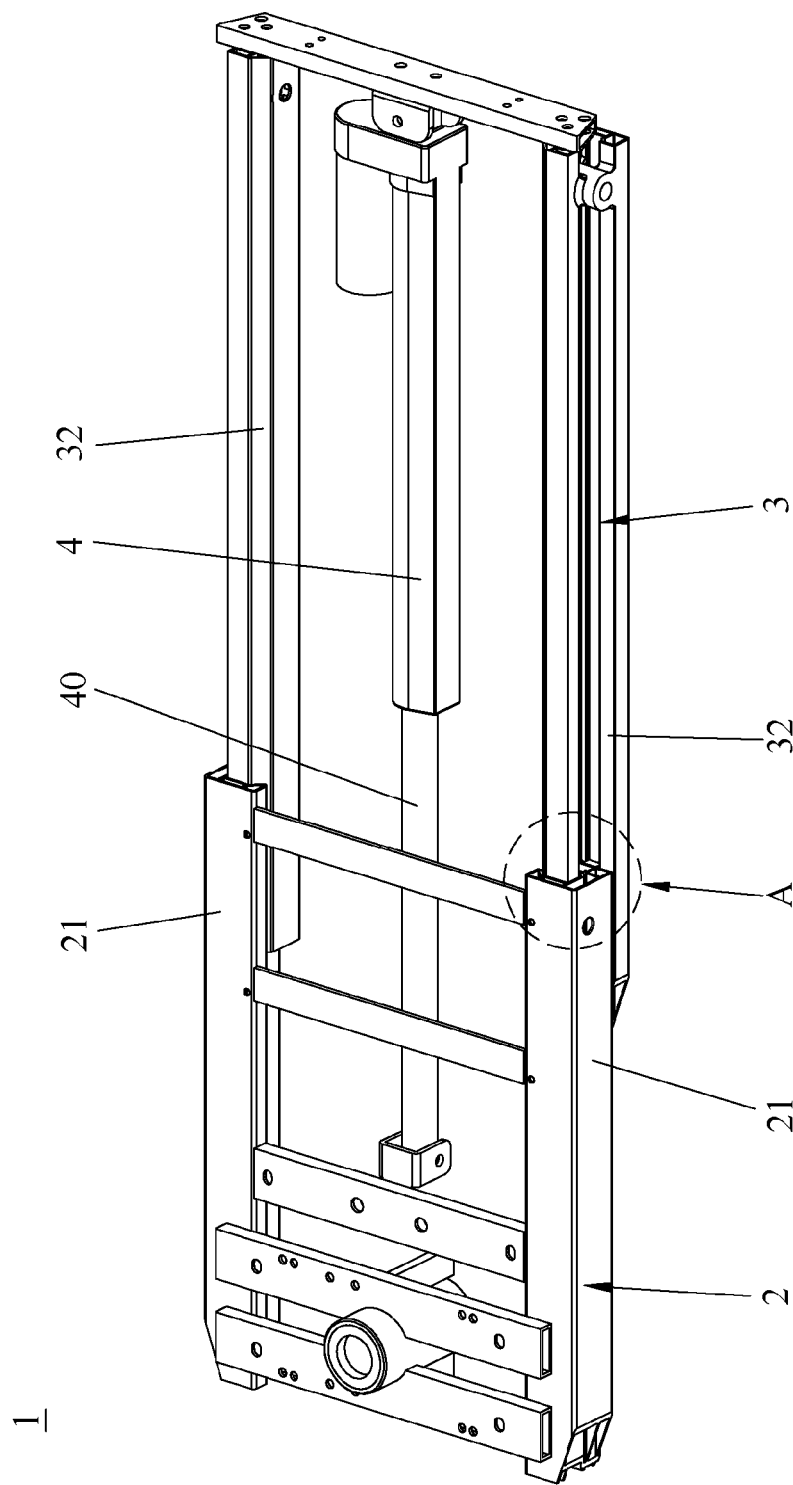
FIG. 1 is a three-dimensional view of a telescopic frame according to the present invention.

The invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this invention will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present invention, and will not be interpreted in an idealized or overly formal sense unless expressly so defined herein.

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

As used herein, "around", "about", "substantially" or "approximately" shall generally mean within 20 percent, In one embodiment within 10 percent, and more In one embodiment within 5 percent of a given value or range. Numerical quantities given herein are approximate, meaning that the term "around", "about" "substantially" or "approximately" can be inferred if not expressly stated.

The description will be made as to the embodiments of the invention in conjunction with the accompanying drawings.

Figure 2:
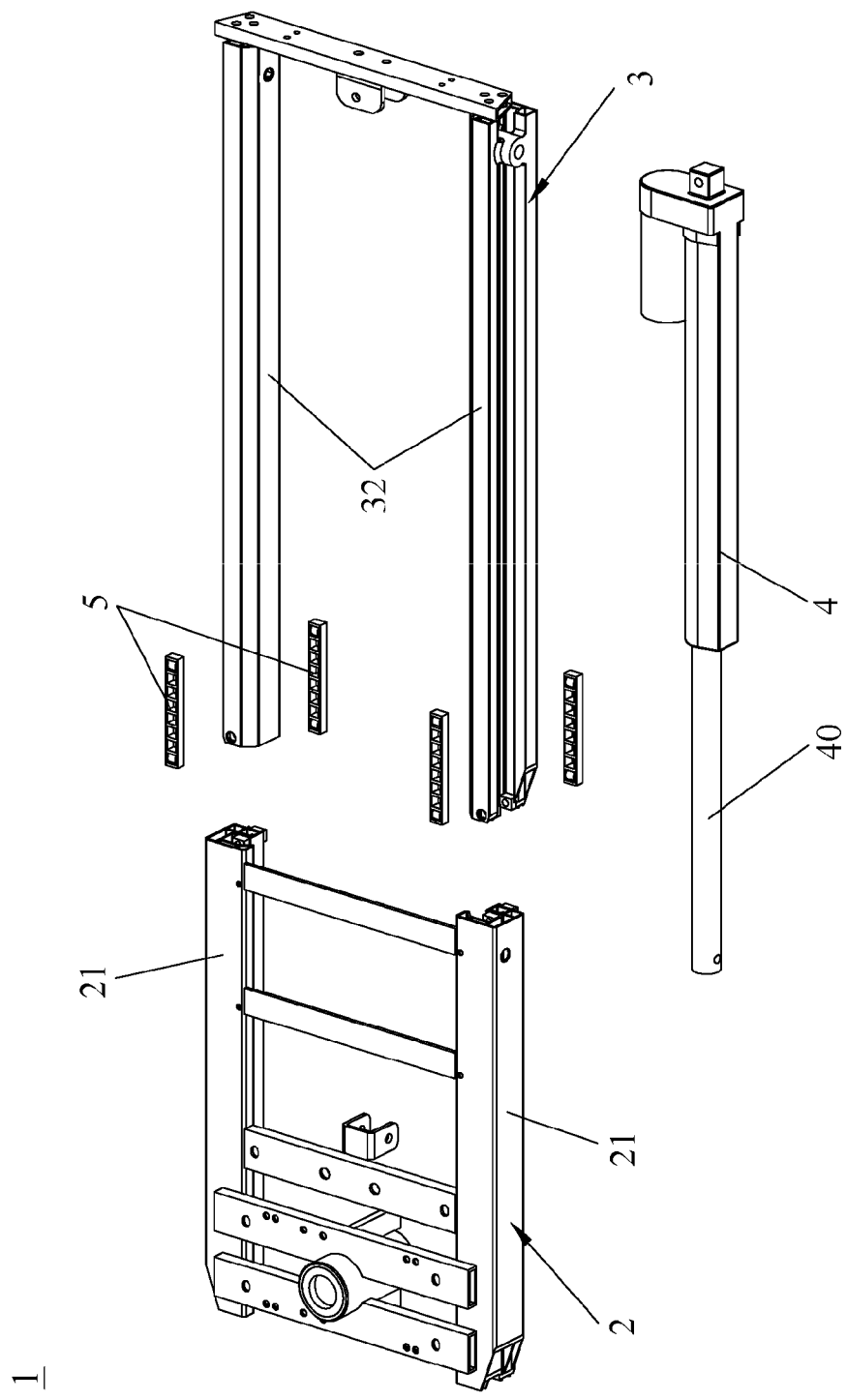
FIG. 2 is a schematic exploded view of the telescopic frame according to the present invention.
Figure 3:
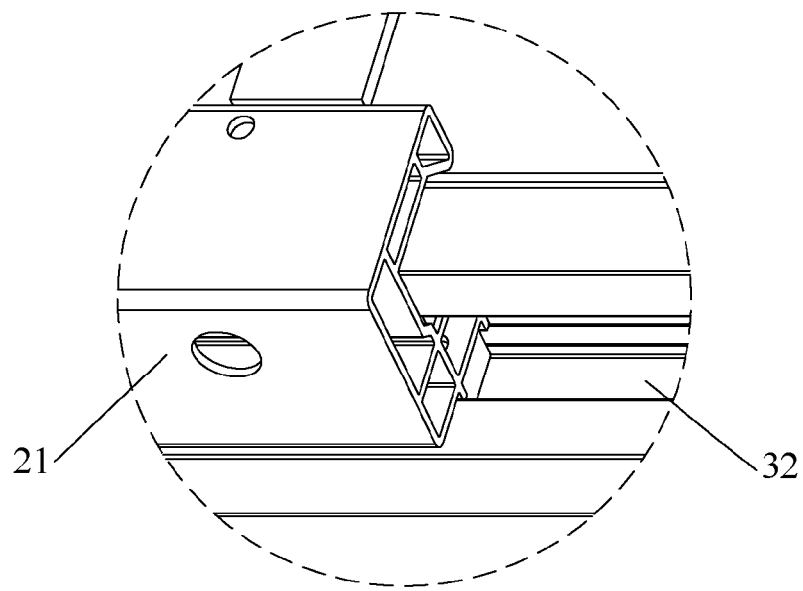
FIG. 3 is an enlarged view of a position A in FIG. 1.

Referring to FIG. 1 and FIG. 2, the present invention provides a telescopic frame 1, which is applicable to a foldable bicycle or foldable electric vehicle, and includes a front frame 2, a rear frame 3, a telescopic device and roller mechanisms 5. In one embodiment, in this embodiment, the telescopic device is an electric push rod 4.

First guide rails 21 are symmetrically disposed on two sides of the front frame 2, second guide rails 32 are symmetrically disposed on two sides of the rear frame 3, and the first guide rails 21 and the second guide rails 32 are fitted together and slidably connected.

Figure 4:
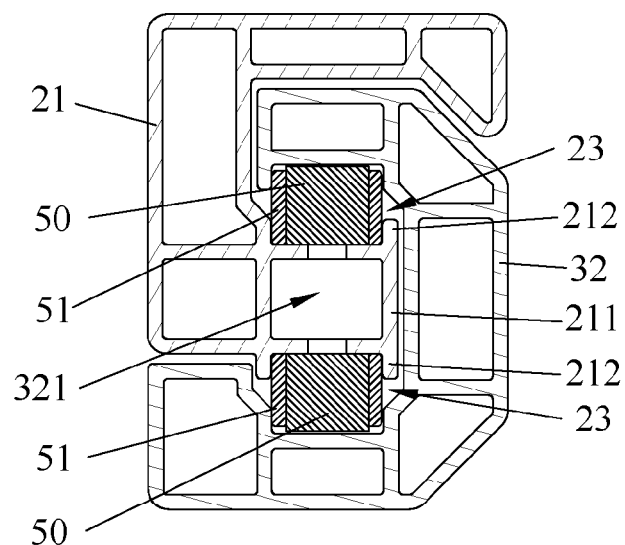
FIG. 4 is a cross-sectional view of a first guide rail and a second guide rail along a central axis of a roller in the telescopic frame according to the present invention.

Referring to FIG. 4, in this embodiment, the cross sections of the first guide rail 21 and the second guide rail 32 are both C-shaped, and the C-shaped openings of the first guide rail 21 and the second guide rail 32 face each other and are engaged, so that the first guide rail 21 and the second guide rail 32 are fitted together. The first guide rail 21 has a rib portion 211, the second guide rail 32 has a guide rail groove 321, and the rib portion 211 slidably matches with the guide rail groove 321 to realize slidable connection between the first guide rail 21 and the second guide rail 32. Two sliding slots 23 are respectively formed between two side walls of the rib portion 211 and two side walls of the guide rail groove 321.

Figure 5:
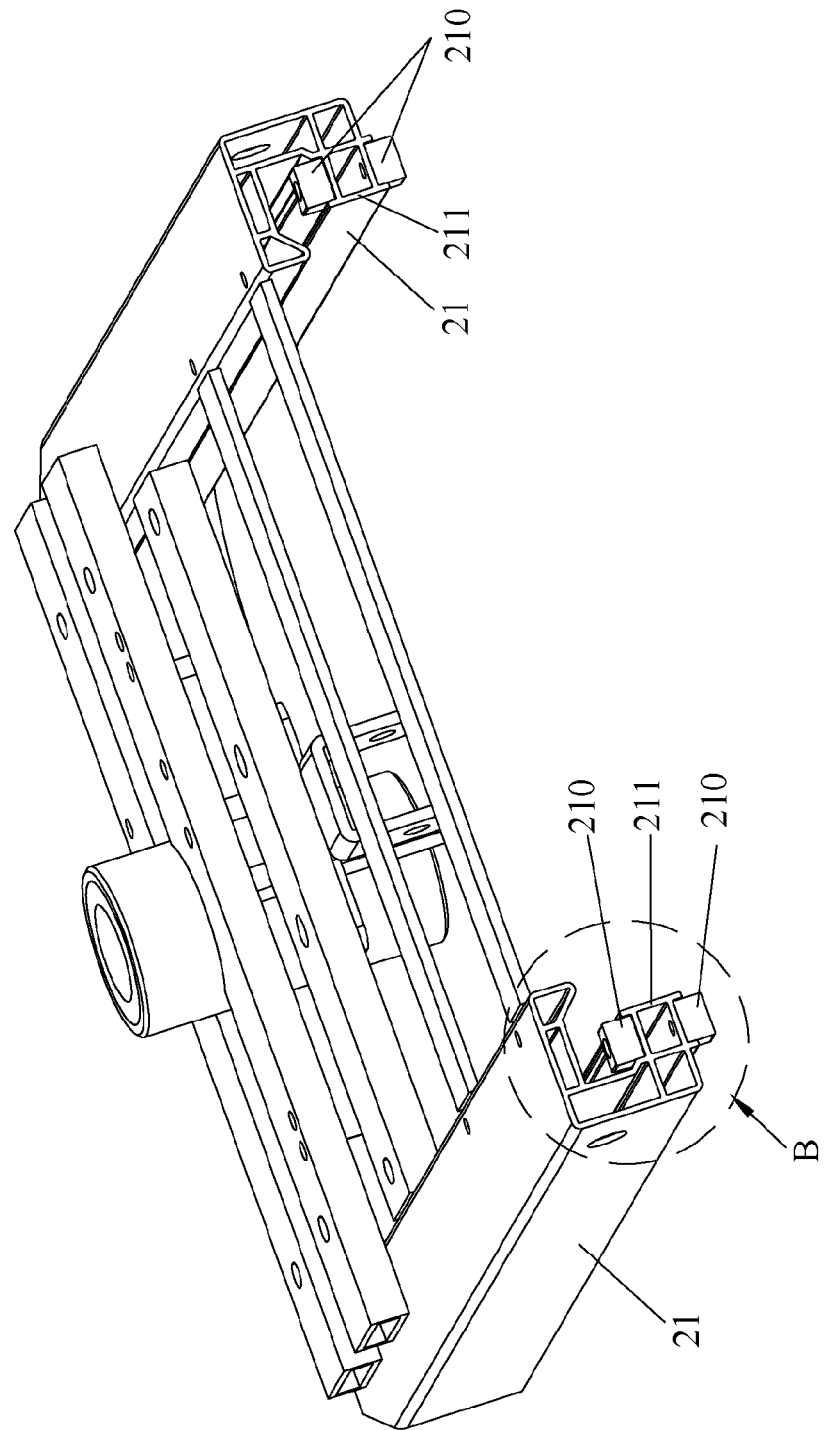
FIG. 5 is a three-dimensional view of a front frame in the telescopic frame according to the present invention.
Figure 6:
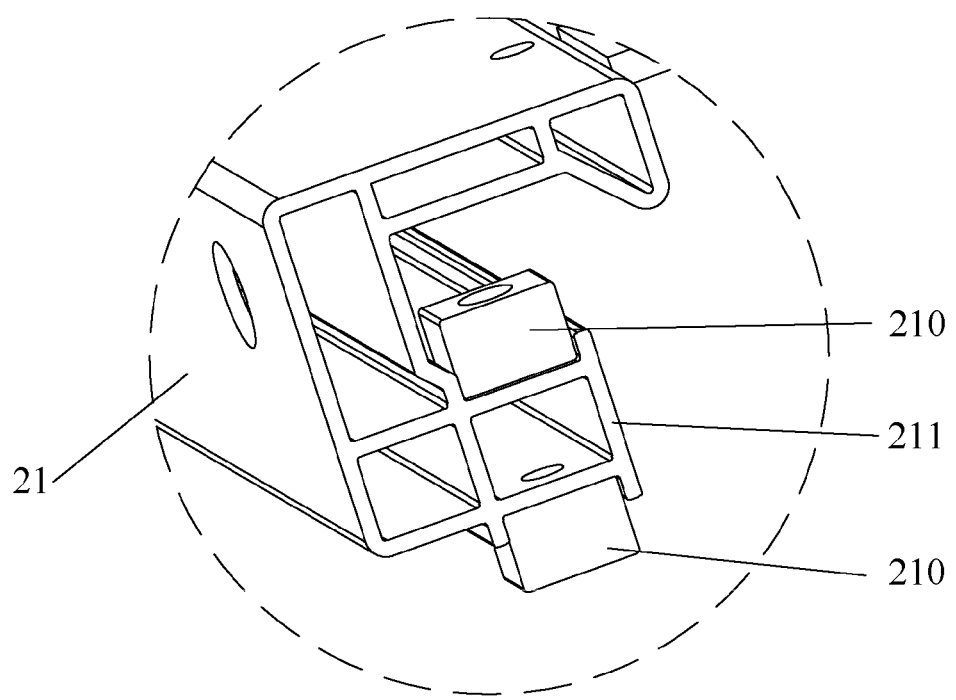
FIG. 6 is an enlarged view of a position B in FIG. 5.
Figure 7:
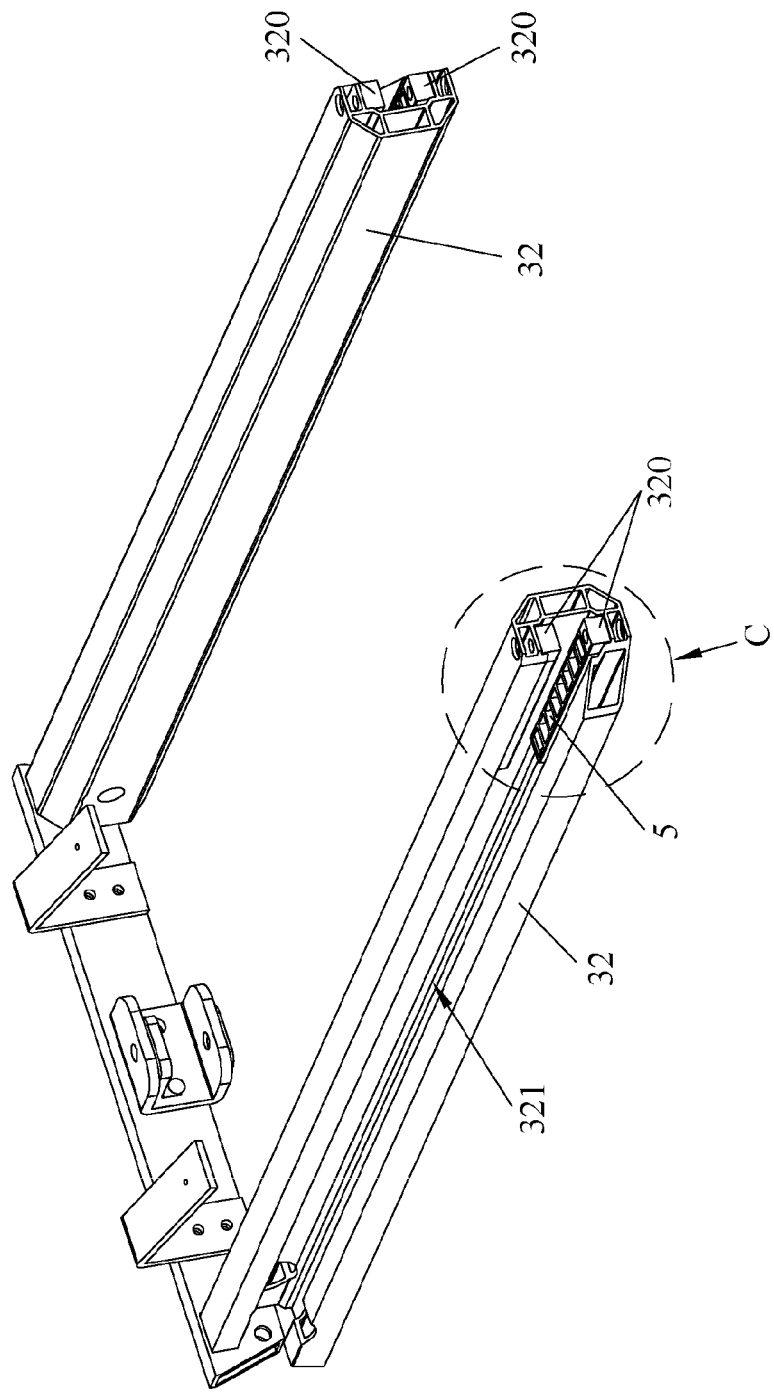
FIG. 7 is a three-dimensional view of a rear frame in the telescopic frame according to the present invention.
Figure 8:
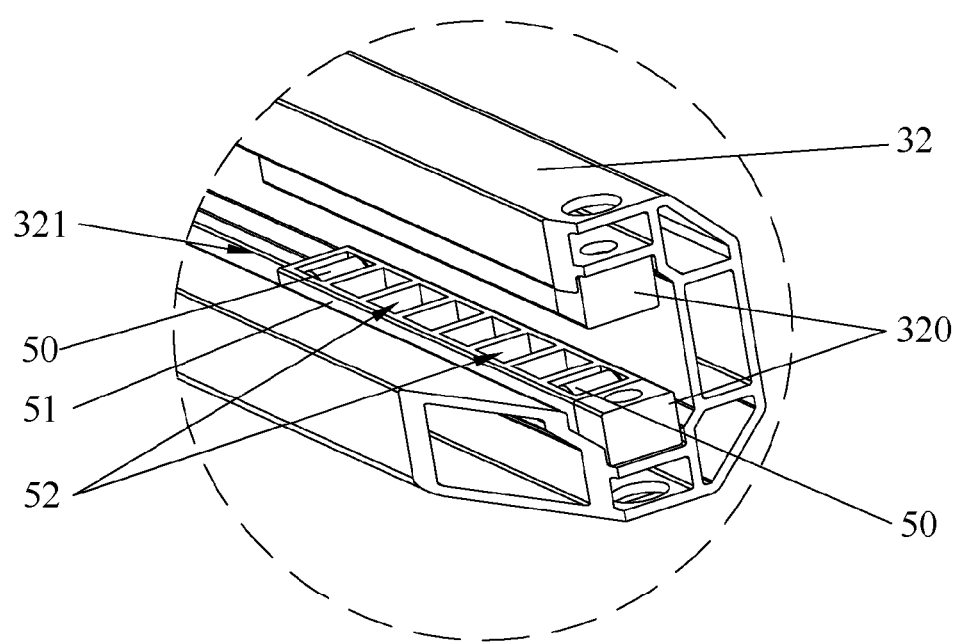
FIG. 8 is an enlarged view of a position C in FIG. 7.

Referring to FIG. 5 and FIG. 6, first sliding blocks 210 are fixedly disposed on the side walls at an end of the rib portion 211, and the first sliding blocks 210 are embedded in the second guide rail 32 and capable of sliding along the sliding slots 23. Referring to FIG. 7 and FIG. 8, second sliding blocks 320 are fixedly disposed on inner side walls at an end of the second guide rail 32, and the second sliding blocks 320 are embedded in the first guide rail 21 and capable of sliding along the sliding slots 23. By respectively disposing the first sliding blocks 210 on the side walls at the end of the rib portion 211 and disposing the second sliding blocks 320 on the inner side walls at the end of the second guide rail 32, and enabling the first sliding blocks 210 and the second sliding blocks 320 to slide in the sliding slots 23, the first guide rail 21 and the second guide rail 32 more closely match with each other, and slide more smoothly. Moreover, the first sliding blocks 210 are capable of urging against the second sliding blocks 320 to prevent the first guide rail 21 and the second guide rail 32 from being apart when the two guide rails are drawn away from each other.

Referring to FIG. 1, the electric push rod 4 is fixed on the rear frame 3, and an output end 40 of the electric push rod 4 is fixed on the front frame 2 to drive the front frame 2 to be unfolded or folded relative to the rear frame 3.

Referring to FIG. 4 and FIG. 8, the roller mechanism 5 includes rollers 50 and a slider bar 51, the slider bar 51 is slidably disposed in the sliding slot 23 and is provided with roller accommodating holes 52, and the rollers 50 are disposed in the roller accommodating holes 52 in a rolling manner and urge against the first guide rail and the second guide rail 32. In one embodiment, in this embodiment, the roller 50 is a cylindrical roller. By disposing the rollers 50 in the sliding slot 23 and enabling the rollers 50 to urge against the first guide rail 21 and the second guide rail 32, sliding friction generated when the first guide rail 21 slides relative to the second guide rail 32 can be partially converted into rolling friction, so that the first guide rail 21 can slide relative to the second guide rail 32 more smoothly. By disposing the slider bar 51 in the sliding slot 23 and providing the slider bar 51 with the roller accommodating holes 52 for accommodating the rollers 50, when the first guide rail 21 slides relative to the second guide rail 32, since the rollers 50 are limited in the roller accommodating holes 52, the distance between the rollers 50 does not change, and even contact is maintained between the rollers 50 and the first guide rail 21 and the second guide rail 32, so as to reduce as much as possible the friction between the first guide rail 21 and the second guide rail 32.

Referring to FIG. 4, a limiting bump 212 extends from the side wall of the rib portion 211, to limit lateral movement of the slider bar 51. The limiting bump 212 can limit the slider bar 51 to only slide along the length direction of the sliding slot 23, so that the slider bar 51 does not move in other directions, and the first guide rail 21 and the second guide rail 32 are ensured to slide stably.

Figure 9:
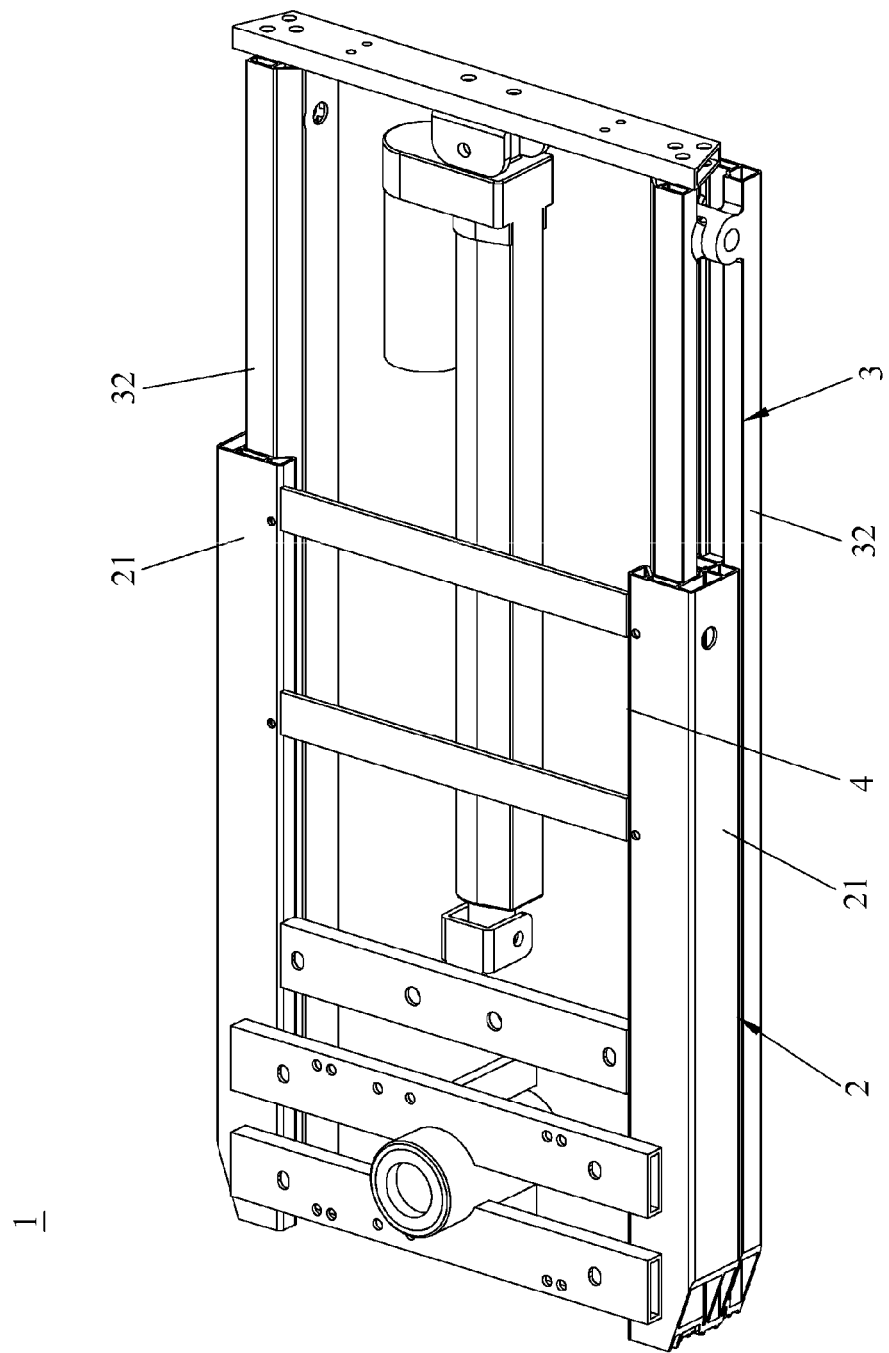
FIG. 9 is a three-dimensional view of the telescopic frame after being folded according to the present invention.

Referring to FIG. 1 and FIG. 9, when the foldable bicycle or foldable electric vehicle needs to be folded, the electric push rod 4 is started, the output end 40 of the electric push rod 4 retracts to pull the front frame 2, and the first guide rail 21 slides along the second guide rail 32 to make the front frame 2 move toward the rear frame 3 till the frame is completely folded. When the foldable bicycle or foldable electric vehicle needs to be unfolded, the electric push rod 4 is started, the output end 40 of the electric push rod 4 extends to push the front frame 2, and the first guide rail 21 slides along the second guide rail 32 to draw the front frame 2 away from the rear frame 3 till the frame is completely unfolded.

Compared with the prior art, the telescopic frame 1 of the present invention is formed by the front frame 2 and the rear frame 3, the first guide rails 21 are disposed on the front frame 2, the second guide rails 32 are disposed on the rear frame 3, and the first guide rails 21 and the second guide rails 32 are fitted together and slidably connected, so that the front frame 2 and the rear frame 3 can slide relative to each other and are folded without requiring any auxiliary part, and thus the structure of the frame is simple. Besides, the electric push rod 4 is fixed on the rear frame 3, and the output end 40 of the electric push rod 4 is fixed on the front frame 2, so that the electric push rod 4 can drive the front frame 2 to slide relative to the rear frame 3, and thus the frame is capable of being automatically folded.

The telescopic frame can find many applications, for example, in a foldable bicycle and a foldable electric vehicle. In one aspect, the invention relates to a foldable bicycle comprising the above disclosed telescopic frame. In another aspect, the invention relates to a foldable electric vehicle comprising the above disclosed telescopic frame.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the invention pertains without departing from its spirit and scope. Accordingly, the scope of the invention is defined by the appended claims rather than the foregoing description and the exemplary embodiments described therein.

What is claimed is:

1. A telescopic frame, usable for a foldable bicycle or foldable electric vehicle, and comprising:
    a front frame;
    a rear frame; and
    a telescopic device,
wherein first guide rails are symmetrically disposed on two sides of the front frame, second guide rails are symmetrically disposed on two sides of the rear frame, and the first guide rails and the second guide rails are fitted together and slidably connected; the telescopic device is fixed on the rear frame, and an output end of the telescopic device is fixed on the front frame to drive the front frame to be unfolded or folded relative to the rear frame.

2. The telescopic frame according to claim 1, wherein the first guide rail has a rib portion, the second guide rail has a guide rail groove, and the rib portion slidably matches with the guide rail groove.

3. The telescopic frame according to claim 2, wherein two sliding slots are respectively formed between two side walls of the rib portion and two side walls of the guide rail groove.

4. The telescopic frame according to claim 3, wherein first sliding blocks are fixedly disposed on the side walls of the rib portion and slide in the sliding slots, second sliding blocks are fixedly disposed on inner side walls at an end of the second guide rail and slide in the sliding slots, and the first sliding blocks are capable of urging against the second sliding blocks to prevent the first guide rail and the second guide rail from being apart.

5. The telescopic frame according to claim 3, further comprising: roller mechanisms, wherein the roller mechanism comprises rollers, the rollers are disposed in the sliding slot in a rolling manner, and the rollers urge against the first guide rail and the second guide rail.

6. The telescopic frame according to claim 5, wherein the roller is a cylindrical roller or a rolling ball.

7. The telescopic frame according to claim 5, wherein the roller mechanism further comprises a slider bar, the slider bar is slidably disposed in the sliding slot and is provided with roller accommodating holes, and the rollers are disposed in the roller accommodating holes.

8. The telescopic frame according to claim 7, wherein a limiting bump extends from the side wall of the rib portion, to limit lateral movement of the slider bar.

9. The telescopic frame according to claim 1, wherein the telescopic device is an electric push rod.

10. A foldable bicycle, comprising the telescopic frame according to claim 1.

11. A foldable electric vehicle, comprising the telescopic frame according to claim 1.

* * * * *